(12) United States Patent
Uchida

(10) Patent No.: US 8,035,749 B2
(45) Date of Patent: Oct. 11, 2011

(54) GAMMA-CORRECTION CIRCUIT FOR GRAPHIC SIGNALS

(75) Inventor: Tomoaki Uchida, Noda (JP)

(73) Assignee: InfoVision Optoelectronics Holdings Limited, Tortola (VG)

( * ) Notice: Subject to any disclaimer, the term of this patent is extended or adjusted under 35 U.S.C. 154(b) by 1021 days.

(21) Appl. No.: 11/923,177

(22) Filed: Oct. 24, 2007

(65) Prior Publication Data
US 2008/0100729 A1    May 1, 2008

(30) Foreign Application Priority Data
Oct. 25, 2006  (JP) .................... 2006-289419

(51) Int. Cl.
H04N 5/202   (2006.01)
H04N 5/20    (2006.01)
G06K 9/40    (2006.01)
G09G 5/02    (2006.01)

(52) U.S. Cl. ........ 348/674; 348/254; 348/255; 382/275; 345/589

(58) Field of Classification Search .............. 348/254, 348/255, 674; 382/275; 345/589
See application file for complete search history.

(56) References Cited

FOREIGN PATENT DOCUMENTS
JP        06 197240        7/1994

*Primary Examiner* — Dominic D Saltarelli
(74) *Attorney, Agent, or Firm* — Connolly Bove Lodge & Hutz LLP

(57) ABSTRACT

The present invention provides a gamma-correction circuit, which is capable to decrease the noise in graphic signal or make the noise not clearly sensible while carrying out gamma-correction on the graphic signals. In the circuit, a high-pass filter is used to decrease the noise in a graphic signal, a gamma-correction section is used for carrying out gamma-correction on the noise suppressed graphic signal, meanwhile a threshold handling section is used for threshold treatment on the high frequency component of the graphic signal to decrease noise, and then the output of the threshold handling section is combined with the gamma-corrected graphic signal through an adder.

8 Claims, 3 Drawing Sheets

GAMMA-CORRECTION CIRCUIT FOR GRAPHIC SIGNALS

TECHNICAL FIELD

The present invention relates to a gamma-correction circuit for forming the brightness signal of graphic signals.

BACKGROUND ART

In a graphic display device for TV receiver etc., gamma-correction is the kind of correction to make both the input signal and the illuminating output signal of a display device become linear. Moreover, gamma-correction can also be carried out automatically based on the histogram and average brightness level of the graphic signals.

While carrying out gamma-correction, if the slope of the gamma-correction characteristic curve of the darker portion of graphic signals increases, the contrast of the darker portion will increase, and the noise component of graphic signals will also increase, causing even greater noise. From visual aspect, noise in the darker portion of graphic is more significant, thus in this case, more serious problems exist for graphic of poor signal-to-noise ratio such as significant noises.

Prior arts deal with such problems by restricting the amount of gamma-correction not to exceed certain specified value, which, however, is not an effective solution as far as noise is concerned.

SUMMARY OF THE INVENTION

Therefore, the object of the present invention is to provide a gamma-correction circuit for graphic signals, which is capable to suppress the noise or make the noise not clearly sensible while carrying out gamma-correction on the graphic signals.

A gamma-correction circuit for graphic signals according to the first aspect of the present invention comprising:

a high-pass filter for input signals to form the brightness signal of the graphic signals;

a multiplier to output a K multiple for the signals outputted from the high-pass filter;

a subtractor to subtract the output signal of the multiplier from the brightness signal forming the graphic signals;

a gamma-correction section for carrying out gamma-correction on the signal outputted from the subtracter;

a threshold handling section for only outputting signals whose amplitudes exceed a preset threshold from the signals outputted from the multiplier; and an adder for adding both the signal outputted from the threshold handling section and the signal outputted from the multiplier.

And, a gamma-correction circuit for graphic signals according to the second aspect of the present invention is characterized as comprising:

a high-pass filter for input signals to form the brightness signal of the graphic signals;

a multiplier to output a K multiple for the signals outputted from the high-pass filter;

a threshold handling section for threshold handling for the signals outputted from the multiplier;

a subtractor to subtract the output signal of the multiplier from the brightness signal forming the graphic signals;

a gamma-correction section for carrying out gamma-correction on the signal outputted from the subtracter; and an adder for adding both the signal outputted from the threshold handling section and the signal outputted from the gamma-correction section.

And, a gamma-correction circuit for graphic signals according to the third aspect of the present invention is related to the gamma-correction circuit for graphic signals according to the first or the second aspect of the present invention and is characterized as:

The value of the K for said brightness signal is increased where the brightness is lower, but decreased where the brightness is higher.

Because noise due to gamma-correction is more sensible in a range where the brightness level is lower, thus K value approach 1 for signal levels in the range A, but set K value as 0 for signal levels out of this range.

Besides, a gamma-correction circuit for graphic signals according to the fourth aspect of the present invention is related to the gamma-correction circuit for graphic signals according to the first or the second aspect of the present invention and is characterized as:

Set said K at a greater value for said brightness signal in a range wherein the slope of gamma characteristic curve is greater;

And set said K at a smaller value for said brightness signal in a range wherein the slope of gamma characteristic curve is smaller.

Since the noise increases in case the slope of the gamma characteristic curve is greater than 1, so set K value as 1 to suppress noise when the slope of the gamma characteristic curve is greater than 1.

In addition, a gamma-correction circuit for graphic signals according to the fifth aspect of the present invention is related to the gamma-correction circuit for graphic signals according to the first or the second aspect of the present invention and is characterized as:

Set said K as a greater value for said brightness signal in a region where the brightness is lower and the slope of gamma characteristic curve is greater, And set said K as a smaller value for said brightness signal in any other region.

The present invention is suitable in the following cases: when the noise is significant due to gamma-correction in a region where the brightness level is lower, and when the noise increases while the slope of the gamma characteristic curve is greater than 1.

According to the present invention, noise can be suppressed or made not so significant while gamma-correction is performed on the graphic signals.

Figure 1:
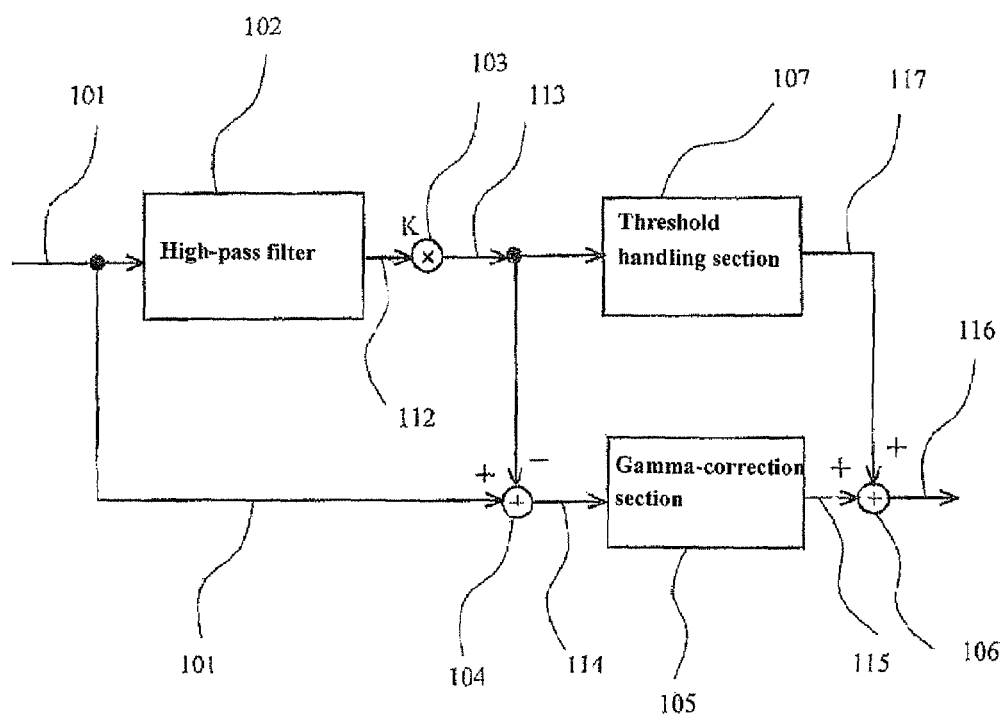
FIG. 1 is a schematic block diagram of the graphic processing system which includes a gamma-correction circuit according to an embodiment of the present invention and displays images by receiving and sending graphic signals.

A list of labels used in the Figures:
101 graphic signals
102 high-pass filter
103 multiplier to output a K multiple of its input signal
104 subtracter
105 gamma-correction section
106 adder 107 threshold handling section
112 graphic signals
113 signal outputted from the multiplier
114 signal outputted from the subtracter
115 gamma-corrected signal
116 signal outputted from the adder
201 a curve showing the gamma characteristics

EMBODIMENTS

Referring to the drawings, the preferred embodiments of the present invention are described as follows.

FIG. 1 is a schematic block diagram of the graphic processing system which includes a gamma-correction circuit according to an embodiment of the present invention and displays images by receiving and sending graphic signals. In FIG. 1, 101 is graphic signal, 102 is a high-pass filter, 103 is a multiplier to output a K multiple of its input signal, 113 is output signal from the multiplier, 112 is signal passing through high-pass filter 102, 107 is a threshold handling section, 117 is signal outputted from the threshold handling section, 104 is a subtracter, 114 is signal outputted from the subtracter, 105 is a gamma-correction section, 106 is an adder, 116 is signal outputted from the adder.

Graphic signal 101 is inputted to high-pass filter 102 and subtractor 104. The noise and high frequency component in the graphic signal 101 inputted to high-pass filter 102 can pass high-pass filter 102. That passed signal 112 is K times multiplied by multiplier 103 and sent to subtracter 104. Subtracter 104 then subtract signal 113 outputted from multiplier 103 from graphic signal 101. The noise and high frequency component, after the filtering processing on the graphic signal 101 through high-pass filter 102, are K multiplied by multiplier 103 to get signal 113. Therefore, when K equals 1, signal 114 outputted from subtracter 104 is the result of subtraction of noise and high frequency component in graphic signal 101 from graphic signal 101 itself, i.e. a result of noise component being removed from graphic signal 101.

When K is 0, output signal 114 is the same as graphic signal 101, its noise component has not changed.

When K is 0.5, subtracter 104 can be used to subtract output signal 113 of multiplier 103 from graphic signal 101, signal 113 is a half-value signal obtained by halving output signal 112 of high-pass filter 102, as a result signal 114 has only half of the noise component in graphic signal 101. Said noise suppressed output signal 114 of subtracter 104 can be processed by gamma-correction section 105.

On the other hand, output signal 113 of multiplier 103 is further threshold treated by threshold handling section 107, outputting only those signals with its amplitude being higher than a preset value as output signal 117. As a result, threshold handling section 107 can be used to remove noise component whose amplitude is relatively lower.

Said threshold treated signal 117 through threshold handling section 107 is high frequency component signal with noise suppressed to some extent. This noise-suppressed high frequency component signal 117 is then added with gamma-corrected signal 115 through adder 106, therefore, gamma-corrected signal 115 is joined with high frequency component, high frequency component removed by subtracter 104 thus gets made up.

In conclusion, the treatment of the gamma-correction circuit on graphic signal in the present invention, is carrying out gamma-correction on noise-interference-suppressed low frequency component signal 114 by means of gamma-correction section 105, meanwhile performing threshold treatment on high frequency component signal 113 by means of threshold handling section 107 to suppress noise, then adding signal 117 and signal 115 with adder 106. In this way, noise component in graphic signal can be decreased even if in a region where the slope of gamma-correction characteristic curve is greater, avoiding noise being clearly sensed.

Said effect may be controlled by the multiplication coefficient K of the multiplier 103, the effect is the strongest when coefficient K is "1" while the effect is naught when coefficient K is 0. In the gamma-correction circuit for graphic signals of the present invention, output signal 113 of multiplier 103 includes high frequency component of the graphic signal, hence there is a shortcoming that said high frequency component cannot be gamma-corrected, however, the unfavorable influence brought by the shortcoming is unimportant, moreover, through setting appropriate K value, noise can be suppressed and meanwhile the unfavorable influence brought by said shortcoming also reduced.

Figure 2:
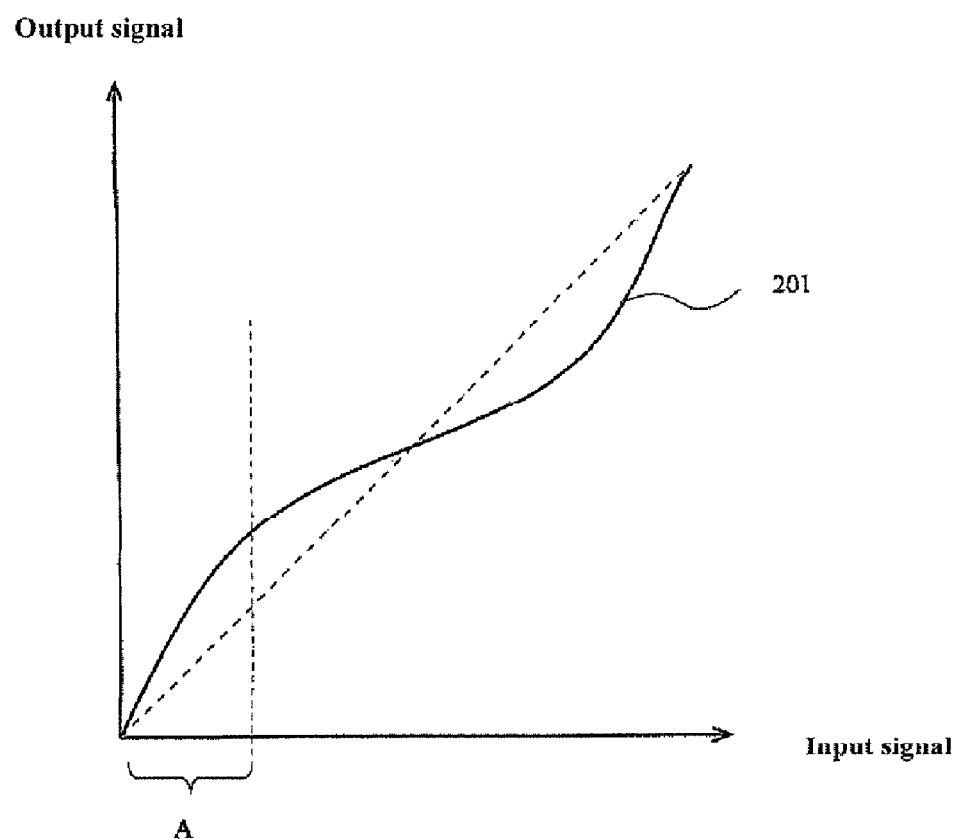
FIG. 2 shows a curve for an example of the gamma-correction characteristic.

FIG. 2 shows a curve for an example of the gamma-correction characteristic. In FIG. 2, 201 illustrates a gamma characteristic curve, A denotes the range of lower brightness level. In this lower brightness level range, noise due to gamma-correction is easily sensible. Therefore, if K is set approaching 1 for signal levels within range A whereas K is set to 0 for signal levels other than said range, noise can then be decreased effectively.

Figure 3:
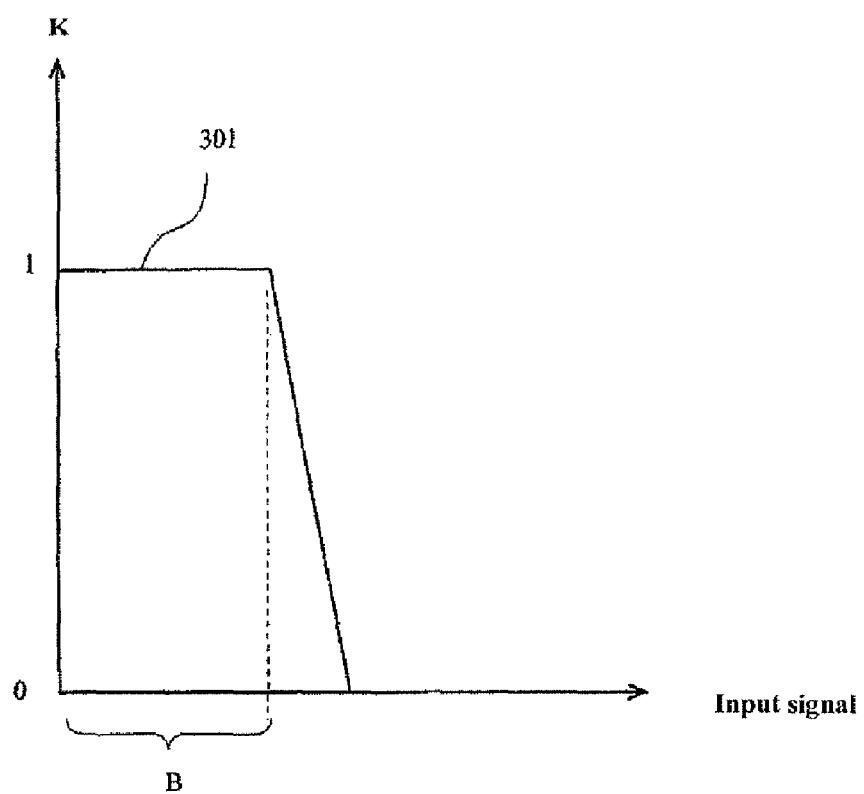
FIG. 3 shows a curve for cases wherein K is set to approach 1 for signal levels in a range of lower brightness and K is set to be 0 for signal levels outside said range.

FIG. 3 shows a curve for cases wherein K is set to approach 1 for signal levels in a range of lower brightness and K is set to be 0 for signal levels outside said range.

In FIG. 3, B denotes the range of lower brightness level, 301 illustrates the curve of K value.

In addition, because noise increase where the slope of gamma characteristic curve is greater than 1, it is effective for suppressing noise to set K as 1 in case the slope of gamma characteristic curve is greater than 1.

Besides, although above description has been made for single channel signal, it is applicable respectively to red, blue, and green, the three primary colors of graphic signals. And though graphic signal can be formed with brightness signal and color-difference signals of two channels, the correction treatment of the present invention may be made only to brightness signal, i.e. to multiply the gamma correction coefficient of gamma-correction section 105 in FIG. 1 respectively by the color-difference signals of two channels. This is because there is less noise in color-difference signal whose frequency band is relatively narrower, most part of noise is included in brightness signal.

In addition, since low frequency components in red, blue, and green three primary colors increase or decrease all in the same ratio, the hue changement can be avoided.

Besides, the contents of gamma-correction, high-pass filter, adder, multiplier, and threshold handling belong to prior art, their description is omitted here.

The invention claimed is:

1. A gamma-correction circuit for graphic signals, characterized as comprising:
    a high-pass filter for input signals to form the brightness signal of the graphic signals;
    a multiplier to output a K multiple for the signals outputted from the high-pass filter;
    a subtractor to subtract the output signal of the multiplier from the brightness signal forming the graphic signals;
    a gamma-correction section for carrying out gamma-correction on the signal outputted from the subtracter;
    a threshold handling section for only outputting signals whose amplitudes exceed a preset threshold from the signals outputted from the multiplier; and an adder for adding both the signal outputted from the threshold handling section and the signal outputted from the multiplier.

2. The gamma-correction circuit for graphic signals of claim 1, characterized in that the value of the K for said brightness signal is increased where the brightness is lower, but decreased where the brightness is higher.

3. The gamma-correction circuit for graphic signals of claim 1, characterized in setting said K at a greater value for said brightness signal in a range where the slope of gamma characteristic curve is greater, whereas setting said K at a smaller value for said brightness signal in a range where the slope of gamma characteristic curve is smaller.

4. The gamma-correction circuit for graphic signals of claim 1, characterized in setting said K as a greater value for said brightness signal in a region where the brightness is lower and the slope of gamma characteristic curve is greater, but set said K as a smaller value for said brightness signal in any other region.

5. A gamma-correction circuit for graphic signals, characterized as comprising:
- a high-pass filter for input signals to form the brightness signal in the graphic signals;
- a multiplier to output a K multiple for the signals outputted from the high-pass filter;
- a threshold handling section for only outputting signals whose amplitudes exceed a preset threshold from the signals outputted from the multiplier;
- a subtractor to subtract the output signal of the multiplier from the brightness signal forming the graphic signals;
- a gamma-correction section for carrying out gamma-correction on the signal outputted from the subtracter; and
- an adder for adding both the signal outputted from the threshold handling section and the signal outputted from the gamma-correction section.

6. The gamma-correction circuit for graphic signals of claim 5, characterized in that the value of the K for said brightness signal is increased where the brightness is lower, but decreased where the brightness is higher.

7. The gamma-correction circuit for graphic signals of claim 5, characterized in setting said K at a greater value for said brightness signal in a range where the slope of gamma characteristic curve is greater, whereas setting said K at a smaller value for said brightness signal in a range where the slope of gamma characteristic curve is smaller.

8. The gamma-correction circuit for graphic signals of claim 5, characterized in setting said K as a greater value for said brightness signal in a region where the brightness is lower and the slope of gamma characteristic curve is greater, but set said K as a smaller value for said brightness signal in any other region.

* * * * *